Feb. 5, 1957   L. W. WILKES   2,780,425
AIRCRAFT WING WITH VARIABLE NOSE SLOT
Filed April 30, 1954   2 Sheets-Sheet 1
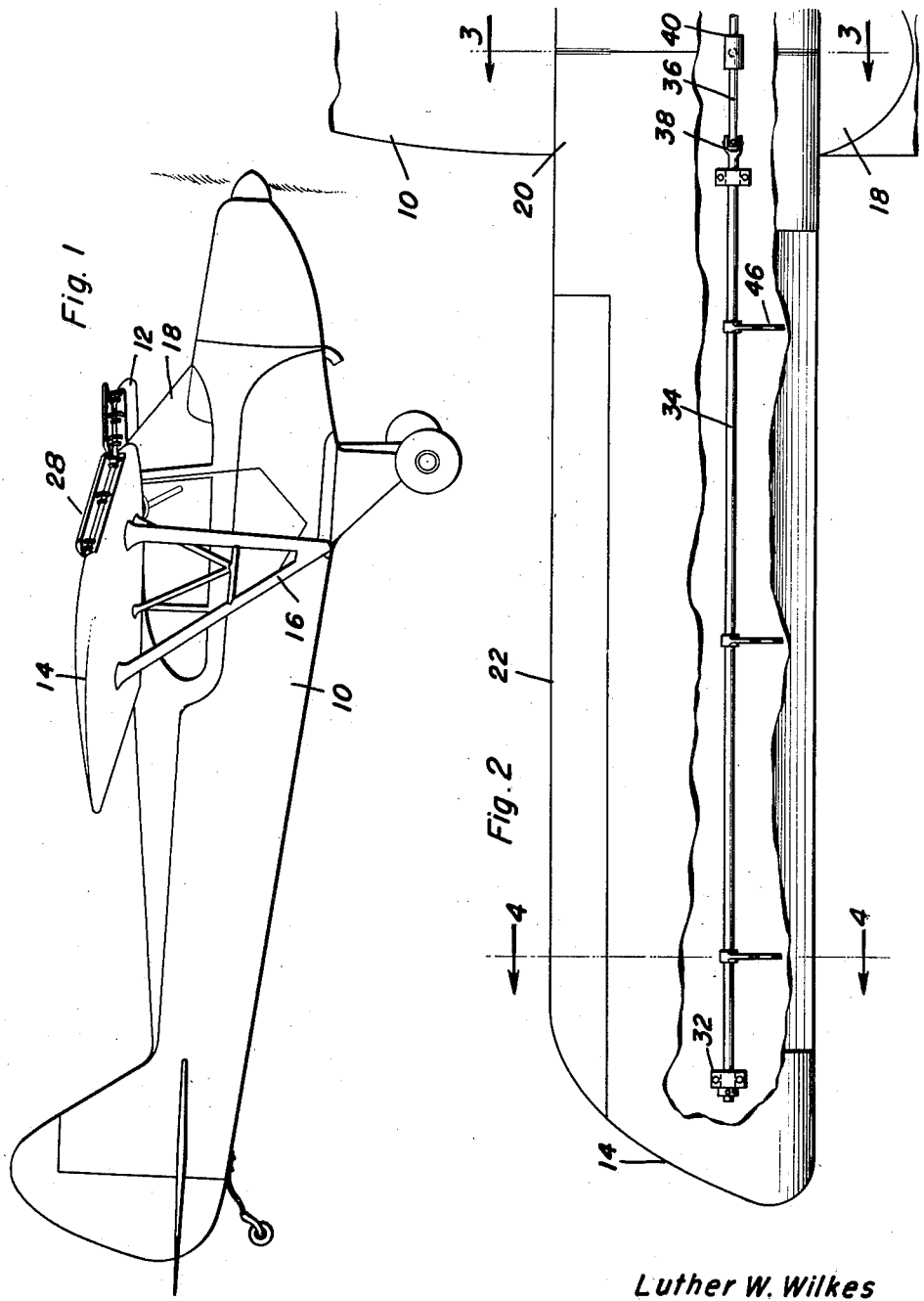
Luther W. Wilkes
INVENTOR.

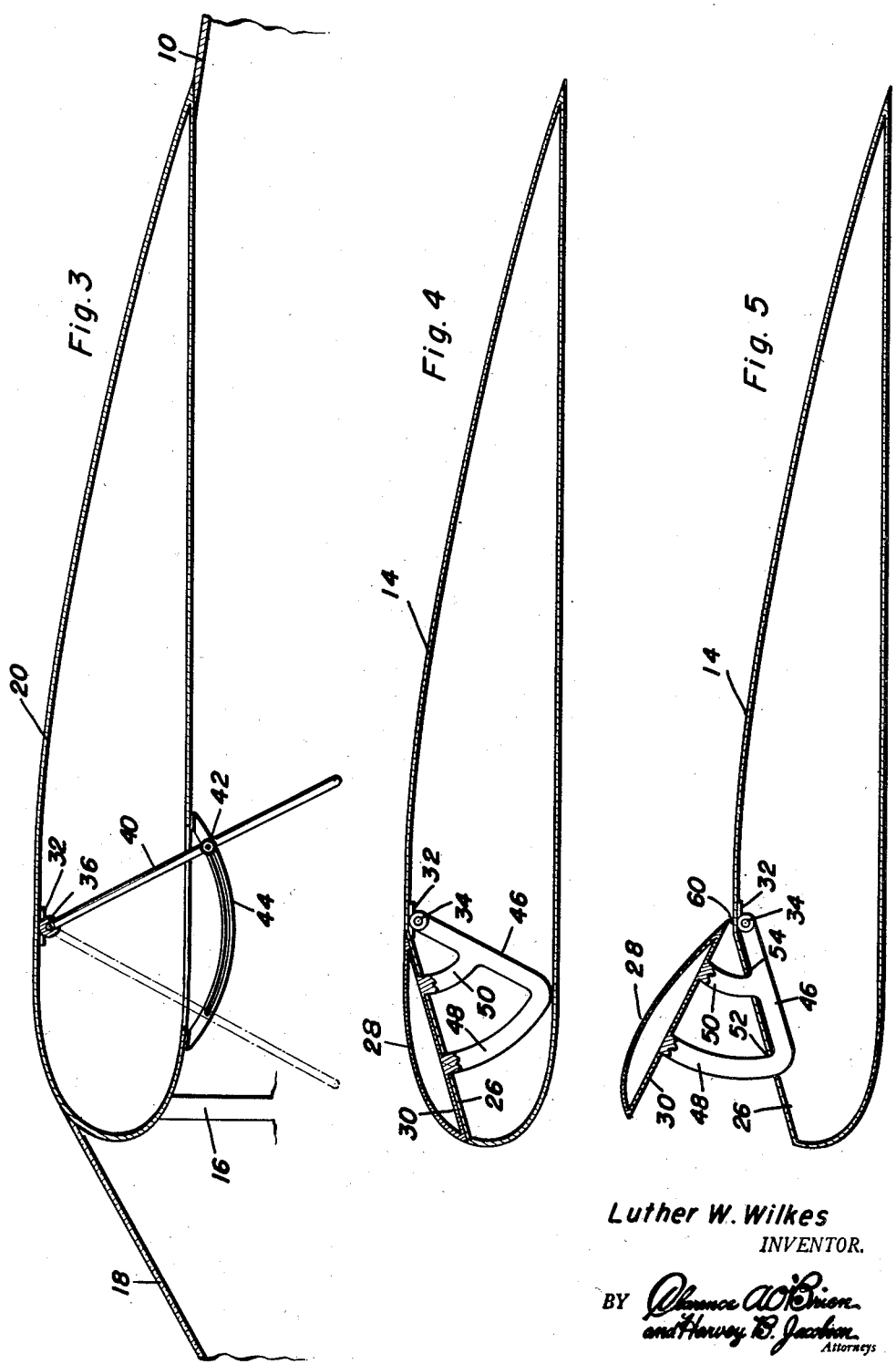

United States Patent Office 2,780,425
Patented Feb. 5, 1957

2,780,425
AIRCRAFT WING WITH VARIABLE NOSE SLOT

Luther W. Wilkes, Brisbin, Pa.

Application April 30, 1954, Serial No. 426,685

2 Claims. (Cl. 244—42)

This invention relates to an aircraft wing and particularly to a wing construction providing a Venturi lift for aircraft for increasing the lift effect thereon.

In the operation of aircraft, substantially the entire lift for the craft is supplied by the flow of air over the upper camber of the wing surfaces and in general this lift is produced because of the rapid flow of air over the surface. The difference in pressure at the top and bottom of the wing is produced by the shape of airfoil causing the air on the top side of the wing to travel further, and consequently faster, thus creating a lower pressure on the top of the wing.

In the construction according to the present invention, the Venturi lift device is provided adjacent the front edge of the wing so that the velocity of the air over the surface of the major portion of the wing may be greatly increased, thus increasing the lift effect of the wing.

In the construction according to the present invention, the forward top leading edge of the wing is provided an adjustable short chord section which may be moved into normal closed relation, in which case the top camber of the wing will be substantially unchanged or it may be lifted into angular relation with the forward section of the wing to produce a Venturi slot extending longitudinally along the front of the wing.

It is accordingly an object of the invention to provide an improved wing structure.

It is a further object of the invention to provide a wing structure having a Venturi slot adjacent the forward edge thereof.

It is a further object of the invention to provide a wing with a short chord section forming the forward top edge thereof.

It is a further object of the invention to provide a short chord section which is movable into and out of normal wing forming formation with the base wing.

Other objects and many of the attendant advantages of the present invention will be apparent from the following detailed description taken in conjunction with the accompanying drawings, in which:

Figure 1 is a perspective view of an aircraft provided with the wing lift according to the invention;

Figure 2 is an enlarged top plan view of a portion of a wing with portions cut away and in section;

Figure 3 is an enlarged longitudinal section through the central portion of the wing and a portion of the aircraft body;

Figure 4 is a cross-section through a wing taken substantially on the plane indicated by the section line 4—4 of Figure 2 and showing the short chord sector in closed position; and Figure 5 is a view similar to Figure 4 but showing the short chord sector in angularly spaced relation to provide a Venturi slot along the leading edge of the wing.

In the construction according to the invention, an aircraft having a suitable body 10 has wings 12 and 14 mounted thereon by means of suitable struts 16 and is provided with a cabin having a forward vision space or window 18.

The base wing sections 12 and 14 are connected by a sector 20 which forms a substantial portion of the cabin of the structure and which is substantially immovable. These wing sections 12 and 14 are each provided with suitable control ailerons 22 on the trailing edge thereof which may be conventionally operated.

Each of the wing structures 12 and 14 is provided with a plane sector 26 which forms a short chord sector across the top leading edge of the base wing sections 12 and 14. The flat section 26 extends obliquely across the corner of the leading top edge to provide an oblique front surface.

A short chord wing sector 28 is provided with a surface 30 which is complementary to the surface 26 and adapted to be firmly seated thereon. The short chord section 28 when the surface 26 is in contact with the surface 30 will provide a normal wing camber with the usual teardrop leading edge and the curved upper surface.

A plurality of bearing brackets 32 are mounted in each of the wing sectors and a control shaft 34 is journaled therein. The shaft 34 is provided with a central section 36 which extends across the cabin of the device and which is connected to the ends 34 by means of a universal joint 38. An operating handle 40 is rigidly secured to the section 36 of a control shaft and is provided with a locking device 42 engageable with a slotted sector 44 so that the operating handle 40 may be adjusted in various positions along the sector 44.

A plurality of mounting arms 46 are rigidly secured on the control shaft 34 and extend within the wing section 14. Mounting struts 48 and 50 are rigidly secured to and preferably integral with the arms 46 and extend through slots 52 and 54 in the oblique surface 26. Preferably the arms 48 and 50 are arcuate so that they pass through the apertures 52 and 54 of minimum size. Obviously, the struts 48 and 50 may be straight or obviously, also, they may be included as a single plate-like device instead of separate struts.

The struts 48 and 50 are of different lengths so that the short chord sector 28 which is mounted on the outer ends thereof extends in angular relation to the arms 46.

In the operation of the device according to the invention, the lever 40 will be adjusted as shown in Figure 3 to maintain the short chord section with the surface 30 in contact with the first surface 26 to provide a substantially normal unbroken wing surface, or may be adjusted along the slotted sector 44 to adjust the short chord sector 28 in any position until the arm 46 is in parallel arrangement with the oblique surface 26, at which time the surfaces 26 and 30 provide a V-shaped trough with a Venturi slot 60 at the apex of the V-shaped slot so that the airflow through the Venturi slot 60 will flow over the surface of the wings 12 and 14 to increase the lift effect thereon.

It will be apparent that the operator of the device by adjusting the angle of the short chord sector 28 may adjust at will the lift and drag effect of the wings so that the device may land and take off on relatively short fields.

For purposes of exemplification, a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

1. A Venturi lift for aircraft comprising a base wing section, the top leading edge of said base wing section being a flat oblique surface, a short chord wing sector mounted for movement into and out of seating relation with said oblique surface and having a flat lower surface, a control shaft journaled in said base wing section in rearwardly spaced relation from the rear edge of the short chord sector, mounting arms fixed on said shaft, strut members mounting said short chord sector in angularly spaced relation to said arms, an actuating lever rigidly mounted on said control shaft for rotating said control shaft, said sector when seated on said surface forming with the base wing section a normal cambered top wing surface, said short chord sector when angularly spaced from said oblique section upon rotation of said shaft forming an elongated flat sided Venturi slot.

2. A Venturi lift for aircraft comprising a base wing section, the top leading edge of said base wing section being a flat oblique surface, a short chord wing sector mounted for movement into and out of seating relation with said oblique surface and having a flat lower surface, a control shaft journaled in said base wing section in rearwardly spaced relation from the rear edge of the short chord sector, mounting arms fixed on said shaft, strut members mounting said short chord sector in angularly spaced relation to said arms, an actuating lever rigidly mounted on said control shaft for rotating said control shaft, said sector when seated on said surface forming with the base wing section a normal cambered top wing surface, said short chord sector when angularly spaced from said oblique section upon rotation of said shaft forming an elongated flat sided Venturi slot, said lever being adjustable to selectively position said short chord sector with respect to said base wing section, an arcuate slotted sector secured to the undersurface of said base wing section, and a locking device carried by said lever engaging said slotted sector to lockingly hold said lever in a selected adjusted position.

References Cited in the file of this patent
UNITED STATES PATENTS

| | | |
|---|---|---|
| 1,777,279 | Anderson | Oct. 7, 1930 |
| 1,817,956 | Wait | Aug. 11, 1931 |
| 1,818,309 | De Villard | Aug. 11, 1931 |
| 1,830,019 | Davis | Nov. 3, 1931 |
| 1,862,421 | O'Malley | June 7, 1932 |
| 1,891,261 | Gunn | Dec. 20, 1932 |
| 1,893,065 | Zaparka | Jan. 3, 1933 |
| 2,271,321 | Wagner et al. | Jan. 27, 1942 |
| 2,676,772 | Salazar | Apr. 27, 1954 |

FOREIGN PATENTS

| | | |
|---|---|---|
| 737,178 | Germany | July 8, 1943 |
| 1,024,467 | France | Jan. 10, 1953 |